United States Patent
Chikamori

(10) Patent No.: US 6,902,799 B2
(45) Date of Patent: Jun. 7, 2005

(54) LAMINATE SHEET

(75) Inventor: Seishi Chikamori, Saitama (JP)

(73) Assignee: IST Corporation, Limited, Tokyo (JP)

(*) Notice: Subject to any disclaimer, the term of this patent is extended or adjusted under 35 U.S.C. 154(b) by 111 days.

(21) Appl. No.: 10/220,917

(22) PCT Filed: Mar. 15, 2002

(86) PCT No.: PCT/JP02/02460

§ 371 (c)(1),
(2), (4) Date: Jan. 10, 2003

(87) PCT Pub. No.: WO02/074536

PCT Pub. Date: Sep. 26, 2002

(65) Prior Publication Data

US 2003/0148692 A1 Aug. 7, 2003

(30) Foreign Application Priority Data

Mar. 21, 2001 (JP) .......................................... 2001-79892

(51) Int. Cl.[7] ............................................... B32B 5/22
(52) U.S. Cl. .............................. 428/317.9; 428/319.3; 428/304.4; 442/370; 442/371; 442/374; 442/401
(58) Field of Search .......................... 428/317.9, 319.3, 428/304.4; 442/370, 401, 371, 374

(56) References Cited

U.S. PATENT DOCUMENTS

| | | | |
|---|---|---|---|
| 4,542,057 A | * 9/1985 | Breitscheidel et al. | ...... 428/126 |
| 4,906,516 A | * 3/1990 | Okamura et al. | ............ 428/215 |
| 4,980,940 A | * 1/1991 | Isshiki | ............................. 5/724 |
| 5,972,815 A | 10/1999 | Bae | |
| 5,993,964 A | * 11/1999 | Nakajima | .................... 428/364 |

FOREIGN PATENT DOCUMENTS

| JP | 9-300510 | 11/1997 |
|---|---|---|
| JP | 11-315482 | 11/1999 |

OTHER PUBLICATIONS

Translation of JP 11–315482, Yoji et al, "Decorative Sheet and Its Production," 1 Nov. 16, 1999.*

* cited by examiner

Primary Examiner—Hai Vo
(74) Attorney, Agent, or Firm—Jordan and Hamburg LLP

(57) ABSTRACT

A laminated sheet which contains a cross-linking foam material, and radiates far infrared so that it has heat-insulating and heat-retentive properties. The laminated sheet (1) has a three-layered structure including polyethylene foam (2) having a sheet shape that is one example of a cross-linking foam material in which a substance that radiates far infrared rays is mixed, non-woven fabric (3) having a sheet shape formed on a lower face thereof and a polyester film (4) formed on an upper face thereof. Since the laminated sheet of the present invention is allowed to radiate far infrared rays, it can greatly shorten the snow-melting time, etc., because of its heat reflection effects in comparison with a sheet made of a single material of non-woven fabric, and it also makes it possible to greatly improve heat-insulating and heat-retentive effects, and also to provide medical effects.

7 Claims, 2 Drawing Sheets

LAMINATE SHEET

FIELD OF THE INVENTION

The present invention relates to a laminated sheet, and, more particularly, concerns a laminated sheet having a heat-insulating property and a heat-retentive property, which contains cross-linking foam material and radiates far infrared rays.

BACKGROUND OF THE INVENTION

Conventionally, heat-insulating sheets have been used for various applications. For example, a road-heating process in which heat-insulating sheets using spun-bonded non-woven fabric are heated to a predetermined temperature so as to melt snow has been known. In these heat-insulating sheets, by utilizing a high heat radiating rate of non-woven fabric, heat radiation to the ground surface is carried out so that, in comparison with a snow-melting facility formed by a general construction using hot water pipes, a snow-melting process is carried out in a shorter time.

Moreover, chilled shelves, which are used for displaying and storing foodstuffs in a supermarket, etc., use materials, such as polyethylene terephthalate (PET) films and woven fabric, as heat-insulating sheets. Moreover, in air-conditioning facilities, water pipes, etc., pipes are covered with heat-insulating sheets so as to increase the heat-retentive effect.

However, in the case of the heat-insulating sheet made of a single material of non-woven fabric, since it has no heat-retentive effect, it fails to effectively utilize subterranean heat, resulting in an insufficient heat-insulating effect. The same is true to the heat-insulating sheet made of a single material of PET film.

The present invention has been devised so as to solve the above-mentioned problems, and its objective is to provide a laminated sheet that can improve the heat-insulating effect and heat-retentive effect by utilizing far infrared rays.

Moreover, another objective of the present invention is to provide a laminated sheet that can shorten the snow-melting time, etc., greatly by utilizing heat reflection effect in comparison with a sheet made of a single material of non-woven fabric.

The other objective of the present invention is to provide a general-purpose laminated sheet that has a wide range of applications.

DISCLOSURE OF THE INVENTION

In order to achieve the above-mentioned objectives, a laminated sheet of the present invention is provided with a cross-linking foam material having a sheet shape, made of polyolefin or polyurethane in which a substance that radiates far infrared rays is mixed, a non-woven fabric having a sheet shape made of the same resin as the cross-linking foam material, which is laminated on one of the two surfaces of the cross-linking foam material, and a film having a sheet shape, made of a polyester or polyolefin film, which is laminated on the other surface of the cross-linking foam material.

In the present invention, since the substance radiating far infrared rays is mixed in the cross-linking foam material, the material is allowed to radiate far infrared rays when heated, and the cross-linking foam material is also provided with heat-insulating and heat-retentive properties, while the film is allowed to apply protective and heat reflecting functions to the surface of the cross-linking foam material.

Here, the above-mentioned film has a structure in which a polyethylene layer and a polyester layer are joined to each other through vapor deposition of aluminum. Moreover, the above-mentioned cross-linking foam material is a cross-linking polyethylene foam material in which a metal oxide is mixed as a substance that radiates far infrared rays, and the above-mentioned non-woven fabric is spun-bonded polypropylene non-woven fabric.

BEST MODES FOR CARRYING OUT THE INVENTION

Referring to attached drawings, the following description will discuss the present invention in detail.

Figure 1:
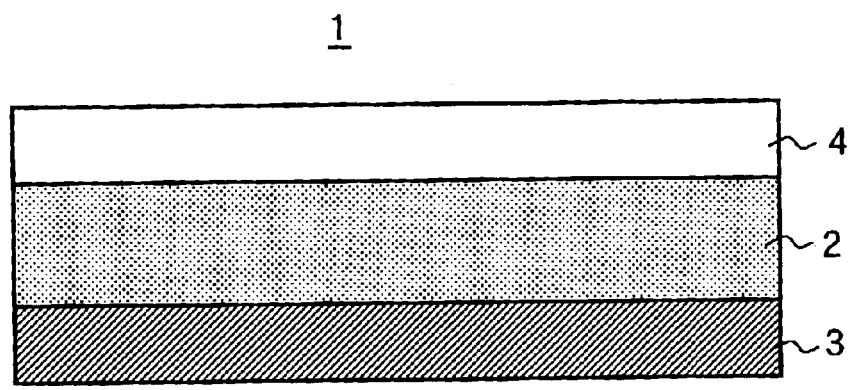
FIG. 1 is a cross-sectional view that shows a preferred embodiment of the present invention.

FIG. 1 is a cross-sectional view that shows a preferred embodiment of a laminated sheet in accordance with the present invention. In this Figure, a laminated sheet 1 has a three-layered structure constituted by a sheet-shaped polyethylene foam (PE foam) 2 that is an example of a cross-linking foam material in which a substance that radiates far infrared rays is mixed, a sheet-shaped non-woven fabric 3 formed on the lower surface thereof and a polyester (PET) film 4 formed on the upper surface of the polyethylene foam 2.

With respect to the foam material, polyolefin materials (polyethylene, polypropylene, polystyrene or various co-polymers) and polyurethane materials are listed. Here, polyethylene and polypropylene are preferably allowed to have a three-dimensional cross-linking structure. Without the cross-linking structure, the material would become inferior in heat resistance, repulsive elasticity and recovering property from compression. Moreover, a substance that radiates far infrared rays is mixed in the foam material.

In the present preferred embodiment, with respect to the cross-linking foam material in which a substance that radiates far infrared rays is mixed, polyethylene resin and aluminum oxide are mixed at a ratio of 100:30, and to this are blended a foaming agent and a foam-generating agent and this is mixed and kneaded sufficiently so as to form polyethylene foam 2 having a size 30 times greater. Thus, the polyethylene foam 2 is allowed to radiate far infrared rays and also to have heat-insulating and heat-retentive properties. With respect to the thickness of the polyethylene foam 2, the material is sliced to a desired value on demand.

Here, with respect to the material radiating far infrared rays, various metal oxides, carbon fibers and porous carbon materials (which are formed by carbonizing a composite material of wood, ligneous material and phenol resin) are listed. From the viewpoint of costs and balance of functions, metal oxides are preferably used, and in the preferred embodiment of FIG. 1, aluminum oxide is used. In addition to aluminum oxide, titanium oxide and zirconium oxide may be used alone or in combination.

The non-woven fabric 3 exerts reinforcing and protective functions on the polyethylene foam 2, and when the laminated structure with the polyethylene foam 2 is taken into consideration, the same kind of resin is preferably used; therefore, non-woven fabric of polypropylene or polystyrene is preferably adopted. When a different kind of resin, such as a polyester non-woven fabric, is combined therewith, it becomes difficult to carry out a thermal fusing process.

Moreover, since the non-woven fabric 3 is applied so as to reinforce and protect the polyethylene foam 2, for these purposes, it is possible to use a cotton cloth such as flat yarn in place of non-woven fabric. However, since the cotton cloth tends to cause a fray at the edge of a laminated product, it is preferable to use non-woven fabric.

With respect to the sheet-shaped non-woven fabric 3 in the present embodiment, polypropylene span-bond non-woven fabric is used; for example, "Xavan® (trade name)" made by Du Pont Corp. is formed into a sheet shape and used. Here, "Xavan®" is non-woven fabric that is originally used for civil construction and applications other than carpets. This non-woven fabric 3 having a mesh of 68 g/m2 and polyethylene foam 2 are joined to each other by using a frame lamination method.

Figure 2:
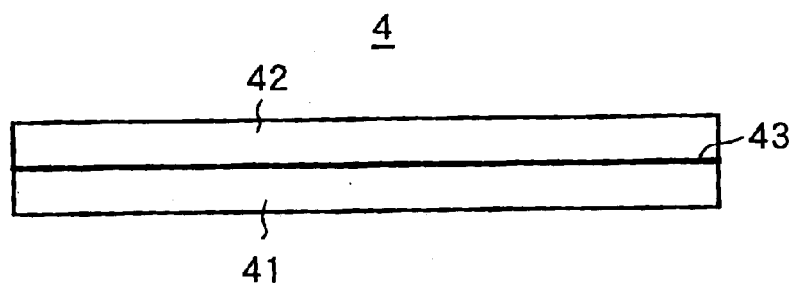
FIG. 2 is a cross-sectional view of an example of a PET film shown in FIG. 1.

Moreover, the film 4 exerts protective and thermal reflection functions onto the surface of the polyethylene foam 2, and a polyester (PET) film to which properties, such as heat-resistant and abrasion-resistant properties, are added is used as the film 4. The PET film 4 in the present embodiment has a structure having a cross-sectional view shown in FIG. 2.

In other words, the PET film 4 is constituted by a polyethylene (PE) layer 41 having a thickness of 15 $\mu$m, a polyester (PET) layer 42 having a thickness of 12 $\mu$m and an aluminum vapor deposition layer 43 that allows these layers to be joined to each other through vapor deposition. The PET film 4 having this structure is joined through a frame lamination method with the PE layer 41 side facing the polyethylene foam 2.

Here, since the PET film 4 has a hydrolyzing property, it is better to avoid applying the laminated sheet to cases in which it is susceptible to an alkaline reaction and immersion to water. If there is such susceptibility, a polyolefin film having a heat resistant property is used in place of the PET film 4.

In the laminated sheet 1 having the above-mentioned arrangement, since the polyethylene foam 2 in which a substance that radiates far infrared rays is mixed is used, it is allowed to radiate far infrared rays in response to the temperature of the laminated sheet 1. A substance, which has absorbed these far infrared rays, converts energy of the far infrared rays to vibration energy and rotation energy of molecules, lattices and atoms of the substance so that the substance itself generates heat.

Here, the radiative heat energy of a substance has been found to be independent of temperature differences and dependent on the absolute temperature of the substance, and Stefan-Boltzmann law, which has defined that energy that is radiated per a unit time from a unit area of a black radiating body having an absolute temperature T is in proportion to the absolute temperature T raised to the 4-th power, has been known. Although the polyethylene foam 2 is not a black radiating body, it is possible to apply Stefan-Boltzmann law thereto by revising the emissivity.

Therefore, in accordance with Stefan-Boltzmann law having a revised emissivity, the heat energy derived from far infrared rays is released from the laminated sheet 1 in response to the ambient temperature. The releasing heat energy of the laminated sheet 1 becomes greater as the ambient temperature becomes higher; and by taking the melting point of polyethylene into consideration, it is more preferable to use it at a temperature up to approximately 60° C.

Figure 3:
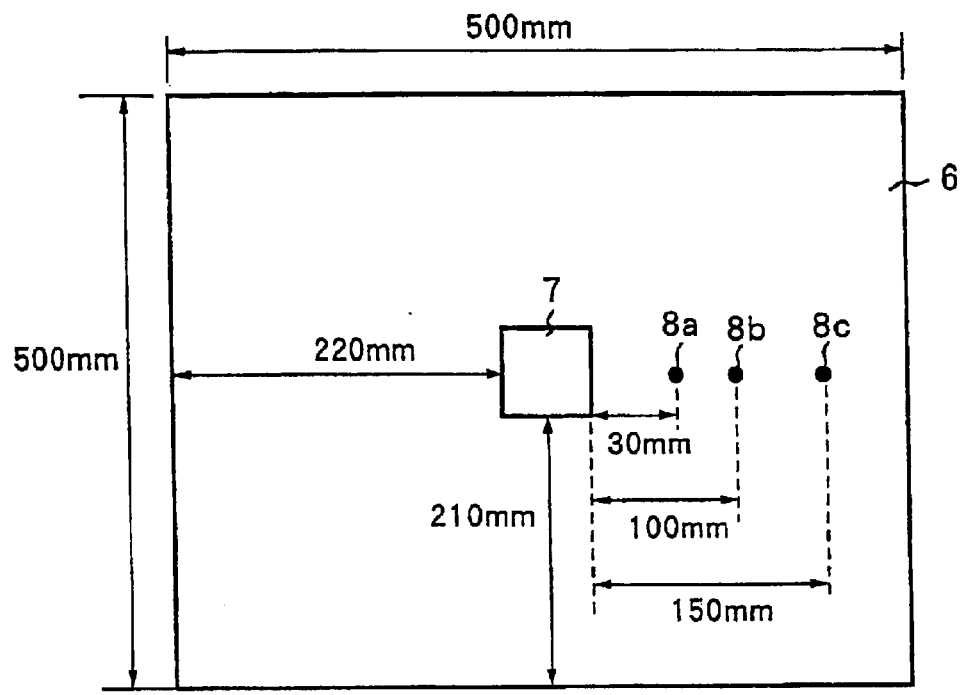
FIG. 3 is an explanatory plan view that shows an example of a measuring method used for measuring the effects of the invention.

Next, with respect to the results of measurements of the effects of radiated heat of the laminated sheet of the present embodiment, an explanation will be given in comparison with a conventional sheet made of a PET film single material. FIG. 3 is a plan view that explains the measuring method in which a measuring sample 6, cut into a rectangular shape of 500 mm in square, has an upper surface (an upper surface of the PET film 4 in the laminated sheet in the preferred embodiment of the present invention) on which a block heater 7 having a surface temperature set to 70° C. is placed, and measurements were made to find out how the temperatures at measuring points 8a, 8b and 8c apart from the block heater 7 respectively by 30 mm, 100 mm and 150 mm varied under a measuring ambient temperature of 23° C. as time elapsed. Table 1 and FIG. 4 show the results of the measurements.

TABLE 1

| Measured surface | Measured Distance | Elapsed Time | | |
|---|---|---|---|---|
| | | 0 minute | 3 minutes | 10 minutes |
| Laminated sheet of the present preferred embodiment | 30 mm | 23.1 | 24.3 | 23.9 |
| | 100 mm | 23.1 | 24.1 | 23.7 |
| | 150 mm | 23.1 | 23.6 | 23.4 |
| Conventional sheet | 30 mm | 22.6 | 23.1 | 23.3 |
| | 100 mm | 22.6 | 22.9 | 23.2 |
| | 150 mm | 22.6 | 22.9 | 23.1 |

Figure 4:
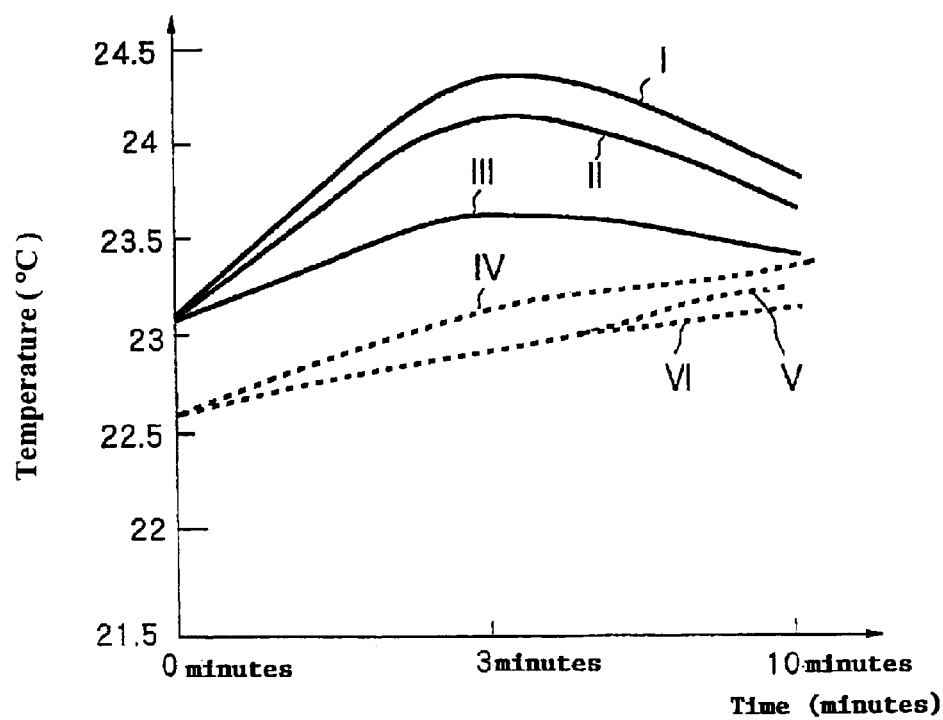
FIG. 4 is a characteristic drawing that shows an example of the effects of the present invention.

Here, I, II and III of FIG. 4 show the results of measurements at measuring points 8a, 8b and 8c of a laminated sheet of the present preferred embodiment, and IV, V and VI of the Figure show the results of measurements at measuring points 8a, 8b and 8c of the conventional sheet. As clearly shown in Table 1 and FIG. 4, the temperatures of the laminated sheet of the present preferred embodiment at the time of measurement start were the same in any of the three measuring points 8a, 8b and 8c; however, as time elapsed, the measuring points closer to the block heater 7 came to have greater temperature increases with the changes occurring abruptly, and became greatest in approximately 3 minutes.

In the case of the conventional sheet also, the temperatures of the laminated sheet of the present preferred embodiment at the time of measurement start were the same in any of the three measuring points 8a, 8b and 8c, and the measuring points closer to the block heater 7 had greater temperature rises as time elapsed; however, since the temperature rise took place gradually, after a lapse of approximately 3 minutes, the temperatures were quite low in comparison with the laminated sheet of the present preferred embodiment. This fact shows that the laminated sheet of the present preferred embodiment has greater radiation heat effects due to far infrared rays, and has a high temperature in a shorter time.

For this reason, for example, when the laminated sheet of the present preferred embodiment is used for snow-melting applications, molecules, etc. of snow and ice are allowed to move by far infrared rays, and the energy can be released as heat; thus, although the heat emissivity is in the same level in comparison with the conventional heat-insulating sheet, it is possible to greatly shorten the snow-melting time due to the heat reflection effects (to shorten to approximately 2 hours from the conventional time of not less than 3 hours), to effectively utilize subterranean heat, and also to greatly improve the heat retentive rate; thus, it becomes possible to prevent the temperature from abruptly dropping.

Moreover, the present invention is not intended to be limited by the above-mentioned preferred embodiment, and can be used for a wide range of applications other than snow-melting applications utilizing heat-radiating, heat-insulating and heat-retentive characteristics by the above-mentioned far infrared rays. For example, the other applications include general applications, such as shoe soles, chairs (backs of the chairs), coasters, toilet seats, bath lids, mats in various places, slippers and various heat-retentive packs, mats for medical-use beds, construction applications such as construction-use floors (tiles, carpets, etc.), bottom lining, heat-retentive materials to be wound around pipes of air conditioning machines and heat-retentive materials for ceilings and walls, applications in green houses (which are considered to increase sweetness in fruits and improve growth of plants) and applications for improving the growth of fish.

Moreover, since the laminated sheet of the present invention has a heat-retentive effect, it has medical effects for treatments such as lumbago, insomnia, subvirile and impotent treatments, skin aging, wrinkle treatments, rough dry skin, numbness of hands and legs, athlete's foot, rheumatism, arthritis, gouty arthritis, stress, chronic hepatitis, hallux valgus and diabetes, and it is also used for applications for recovery from fatigue and prevention of hypertension using salt extraction. Moreover, by directly putting the laminated sheet of the present invention to the human body or putting it on the underwear, it becomes possible to obtain the above-mentioned medical effects and heat-retentive effects.

Furthermore, when the laminated layer of the present invention was wound around the nozzle (cock) of a water pipe and the periphery thereof as a cover, chlorine smell was eliminated, and water quality became milder and the water tasted better. Moreover, it was confirmed that it exerts a superior heat-retentive property. Heating coils may be put through the laminated sheet of the present invention, and applied to a makeshift sauna bath having a box shape or a round shape. Further, the laminated sheet may be directly floated on hot water of a bath, or may be used as a lid of a hot bath, and in this case, the heat of the hot water in the bath is utilized so as to accelerate radiation of far infrared rays.

Moreover, when the inventors applied the laminated sheet of the present invention to the bottom face of an aquarium for tropical fish, they found that it became possible to cure injuries of fish, such as cuts to fins and separation of scales, more quickly. In other words, the laminated sheet of the present invention was affixed onto the entire bottom face of an aquarium (900 mm in length×450 mm in height×450 mm in width), and sand and gravel were put thereon with a thickness of 30 mm to 40 mm, so that tropical fish was kept in a general filtering method in which water was absorbed from the aquarium bottom face toward the upper portion of the aquarium so as to pass through a filter, while in another aquarium, no laminated sheet was affixed onto the bottom face of an aquarium having a size greater than the above-mentioned aquarium (1800 mm in length×600 mm in height×600 mm in width) with overflowed water from the aquarium being sent to a filtering box to be filtered therein so as to prevent the water from contamination, and tropical fish was kept therein; thus, when the two cases were compared with each other, it was found that with respect to injuries and separations of scales in the tropical fish, those of tropical fish kept in the former aquarium having the laminated sheet affixed to the bottom face were cured in approximately 5 to 6 days, while those of tropical fish in the latter conventional aquarium without the laminated sheet affixed thereto were not cured even after a lapse of approximately one week, even though it had a larger aquarium size with better conditions. This fact shows that the application of the laminated sheet of the present invention makes it possible to cure injuries of tropical fish more quickly.

Moreover, a first aquarium (900 mm in length×450 mm in height×450 mm in width) in which laminated sheets of the present invention were affixed onto the total four faces, that is the bottom face, right and left side faces and back face and a second aquarium (900 mm in length×450 mm in height× 450 mm in width) with no laminated sheet being applied thereto were prepared, and the growth rates of water plant in both of the aquariums were compared; thus, a month later, the length of the water plant in the first aquarium had reached approximately 35 mm, while the length of the water plant in the second aquarium was approximately 20 mm, thereby indicating that there was a difference in the growth rate.

INDUSTRIAL APPLICABILITY

As described above, in accordance with the present invention, a substance that radiates far infrared rays is mixed in a sheet-shaped cross-linking foam material on both of the sides of which non-woven fabric and a film are laminated so that it becomes possible to radiate far infrared rays, and consequently to greatly shorten the snow-melting time, etc., by the heat reflection effects in comparison with a sheet made of a single material of non-woven fabric (to approximately 2 hours from the conventional time of not less than 3 hours).

Moreover, in accordance with the present invention, it becomes possible to greatly improve the heat-insulating and heat-retentive effects; thus, by utilizing these effects, the present invention is used for various applications, such as shoe soles, chairs (backs of the chairs), coasters, toilet seats, bath lids, mats in various places, slippers and various heat-retentive packs, mats for medical-use beds, construction-use floors (tiles, carpets, etc.), bottom lining, heat-retentive materials to be wound around pipes of air conditioning machines, heat-retentive materials for ceilings and walls, green houses, nozzles for water pipes (cokes) and peripheral covers and snow-melting sheets, and other applications, and the present invention also exerts medical effects, etc., and makes it possible to achieve a versatile sheet that is used for a wide range of applications.

What is claimed is:
1. A laminated sheet, comprising:
   a cross-linked synthetic resin foam material having a sheet shape and including a material which radiates far infrared rays;
   a non-woven fabric material having a sheet shape, laminated to one of a first surface and a second surface of the cross-linked foam material; and
   a film having a sheet shape laminated to another one of the first surface and the second surface of the cross-linked foam material, wherein said film has structure in which a polyethylene layer and a polyester layer are joined to each other through an aluminum vapor deposition layer, the cross-linked foam material includes a polyolefin or a polyurethane resin, and the non-woven fabric material is made of the same resin as the cross-linked foam material.

2. The laminated sheet according to claim 1, wherein said cross-linked foam material comprises a cross-linked polyethylene foam mixed with a metal oxide, wherein said metal oxide radiates far infrared rays, and said non-woven fabric is a spun-bonded polypropylene fabric.

3. The laminated sheet according to claim 2, wherein said metal oxide is a mixture of a plurality of metal oxides.

4. The laminated sheet according to claim 2, wherein said metal oxide is a single type of metal oxide.

5. A laminated sheet, comprising:
- a cross-linked synthetic resin foam material having a sheet shape and including a metal oxide which radiates far infrared rays;
- a non-woven fabric material having a sheet shape, laminated to one of a first surface and a second surface of the cross-linked foam material; and
- a film having a sheet shape laminated to another one of the first surface and the second surface of the cross-linked foam material, wherein said cross-linked synthetic resin foam material is one of a polyolefin and a polyurethane resin, the non woven material is formed of fibers made from the same resin as the cross-linked foam material, and said film has a structure in which a polyethylene layer and a polyester layer are joined to each other through an aluminum vapor deposition layer.

6. A laminated sheet, comprising:
- a cross-linked synthetic resin foam material having a sheet shape and including a polyethylene foam and an aluminum oxide which radiates far-infrared rays, wherein the aluminum oxide is mixed with a polyethylene resin in a ratio of 30:100;
- a non-woven fabric material having a sheet shape, laminated to one of a first surface and a second surface of the cross-linked foam material and formed of polypropylene or polystyrene; and
- a film having a sheet shape and including a polypropylene layer and a polyester layer joined to each other through an aluminum vapor deposition layer, the polyethylene layer being laminated to another one of the first surface and the second surface of the cross-linked foam material.

7. The laminated sheet according to one of claims 5 and 6 wherein the non-woven fabric material is a spun-bonded polypropylene fabric.

* * * * *